Patented Sept. 20, 1932

1,878,484

UNITED STATES PATENT OFFICE

HAROLD B. FOSTER, OF BUFFALO, NEW YORK, ASSIGNOR TO NATIONAL ANILINE & CHEMICAL CO., INC., OF NEW YORK, N. Y., A CORPORATION OF NEW YORK

PRODUCTION OF TRI-SUBSTITUTED GUANIDINES

No Drawing.  Application filed March 12, 1926.  Serial No. 94,328.

This invention relates to improvements in the manufacture of poly-substituted guanidines which have attached to each nitrogen atom of the guanidine nucleus at least one substituent comprising a hydrocarbon radical or a derivative thereof. The invention relates more particularly to the production of triarylguanidines of the benzene series, and especially triphenylguanidine.

In the desulfurization of a diarylthiourea with lead oxide in the presence of an arylamine and an inert diluent or solvent to produce a triarylguanidine, water is one of the products formed. It has been heretofore considered that the failure in yield and the impurity of the triarylguanidine thus produced has been partly or wholly due to the presence of the water and that its removal, therefore, would lead to an improved result.

The present invention is based on the discovery that the absence or the removal of water from the reaction zone is not necessary or even desirable; and that a low temperature and good agitation are conditions essential to the production of a triarylguanidine in excellent yields and of high purity. Water apparently aids the reaction rather than the contrary and, while its action is not known with certainty, it may function as a catalyst. The optimum temperature at which the reaction is carried out in the presence of an inert solvent varies with the particular guanidine in preparation and for ordinary atmospheric pressures is below the boiling point of the inert solvent and is preferably at or below the minimum boiling point of any azeotropic mixture comprising the solvent which is present during the manufacture of the guanidine. For example, in the production of triphenylguanidine from thiocarbanilid and aniline with water present and toluene as a solvent, a temperature below that of a constant boiling point mixture of toluene and water, about 85° C., and preferably a temperature below 70° C. in commercial operations, and even as low as 40° C., gives with vigorous agitation and without further treatment a product of excellent purity and which contains less than about 0.6 of one per cent of sulfur; within this range of temperature there is a minimum of side reactions that result in the production of undesirable by-products or impurities. With inert organic solvents which are immiscible with water and which with water give azeotropic mixtures having a relatively low minimum boiling point, the reaction may be carried out at the boiling point of said mixture. For example, in the production of triphenylguanidine the reaction may be carried out at ordinary pressure in the presence and at the boiling point of a mixture of benzene and water, i. e., about 69°–70° C. For any triarylguanidine, or a homologue, analogue or derivative thereof, a temperature may be selected for carrying out the reaction in the presence of an inert solvent at which a minimum amount of by-products is formed, and water may be absent or it may be present since its removal is unnecessary. With water present under such conditions of operation, the reaction period is generally but a fraction of that required when water is continuously removed from the reaction zone. The invention may be carried out at ordinary, reduced or increased atmospheric pressures.

The following specific example further describes the invention, but it is to be understood that the invention is not limited thereto; parts are by weight.

A reactor, which may be provided with a reflux condenser to return any condensible vapors given off, is charged with 300 parts of toluene. Then 46 parts (1 mol) of aniline are added, deduction being made for aniline present, particularly if the toluene employed is that recovered from previous runs. The mass is well agitated while 112.5 parts (1 mol) of thiocarbanilid, to which 28 parts of water are added to form a paste, are introduced into it. Heat is applied, as by jacket steam, to bring the well stirred mixture quickly, that is, within about thirty minutes, to a temperature of about 60° C. About 116.9 parts (1.065 mols) of litharge are then introduced over a period of about an hour into the vigorously agitated mass, the temperature in large scale operations being kept below about 70° C., and preferably between 60° and 70°, either by the application of heat or a cooling medium. When all the lead oxide has been added, vigorous agitation is maintained at substantially the same temperature for about two hours or until the reaction is completed, the period being determined largely by the character of the mixture and the agitation, after which the sludge or residue is allowed to settle. The upper liquid layer is then decanted or blown off, filtered and run into an agitated still or drier. The sludge remaining in the reactor can be washed with more toluene which is also passed to the drier. In the drier the toluene is evaporated off, preferably under a high vacuum, and the residue of triphenylguanidine subsequently collected and stored in suitable containers.

A triphenylguanidine can be thus obtained which has a purity of about 97 percent or better as determined by titration in alcoholic solution against standard hydrochloric acid using thymol blue as indicator, which has a melting point of 144° C. or better, and is white to greyish-white in color and substantially free from lead and thiocarbanilide. Such a product, without further treatment or purification, is generally satisfactory for use as an accelerator in the vulcanization of rubber and for other purposes.

The temperature at which the above reaction for the preparation of triphenylguanidine proceeds is preferably kept within the limits stated, as higher temperatures are found to cause an increase in the amount of by-products and a decrease in the purity of the triphenylguanidine. Such a low temperature also means a small heat consumption and a consequent economy in operation. Near or following the completion of the reaction the temperature may be raised to about 90° to prevent crystallization of triphenylguanidine in the pipe lines. The evaporation of the solvent in the drier can be carried out at relatively high temperatures, thus securing a rapid separation; for instance, a jacket temperature of 115° C. for evaporating the toluene has no effect on the product.

In this process good agitation is essential for high yields. To secure efficient agitation it is desirable to provide vertical baffles in the reactor and also horizontal baffles bolted to the vertical baffles above and below the propeller so that a swirling of the entire mass with the propeller agitator is prevented. However, any suitable type of agitator can be used and its specific construction forms no part of this invention.

The lead oxide can be added in bulk at the beginning of the reaction or its addition may be distributed over a period of two hours or longer by feeding it continuously or in small batches at intervals. The yields apparently are somewhat improved if the addition takes place over a period of about an hour instead of in bulk and longer feeding periods have no appreciable effect. Other desulfurizing agents, such as lead hydroxide, basic lead carbonate, zinc oxide, etc. can be used.

In place of toluene other inert solvents can be used. These are preferably non-hydroxylic organic solvents and immiscible with water, such as the hydrocarbons, particularly the aromatic hydrocarbons, e. g., benzene, xylene, solvent naphtha, etc., so that a separation, as by decantation, can be readily effected. Mixed solvents may be employed. Solvents which appreciably react with thioureas or with carbodiarylydiimides are not regarded as inert. It is also preferable to select a solvent whose boiling point in admixture at the pressure employed is not below the optimum temperature at which the reaction best proceeds. By carrying out the reaction at a temperature below the boiling point of the reaction mass, substantial abstraction of heat by the formation of vapors and their condensation in the reflux is minimized or avoided. The amount of solvent used is based upon the quantity and solubility of the triarylguanidine produced at the temperature at which it is filtered so that no substantial amount remains in the sludge or filter cake. It is independent of the quantity of thiocarbanilid or other reagents employed, for the process is applicable to the treatment of a slurry containing undissolved thiocarbanilid. However, the reaction does not require a sufficient amount of solvent to completely dissolve all of the substances concerned for, if it is insufficient to dissolve the triarylguanidine, the reaction still proceeds to completion and the triarylguanidine can thereafter be dissolved out of the sludge by heating to a higher temperature to increase its solubility or by the addition of more solvent. This condition permits considerable latitude in carrying out the process and the apparatus required.

Since the process can be carried out in the presence of any desired amount of water, it follows that water can be added at the beginning of the reaction. It also follows that undried initial material, including the solvent, can be employed in the process.

The present invention is applicable to the production of other poly-substituted guanidines by the action of desulfurizing agents on poly-substituted thioureas in the presence of amines and of indifferent solvents or diluents. For example, in place of aniline there may be used toluidine, xylidine, benzylamine, etc., or their nuclear substitution products such as p-amino dimethylaniline, p-chloraniline, m-nitraniline, etc., or their admixtures; and instead of thiocarbanilid there may be employed ditolylthiourea, phenyltolylthiourea, monophenyl-dimethylthiourea, or other simple or mixed di-, tri-, or tetra-substituted thioureas or their nucleur substitution products.

It will thus be seen that the present invention contemplates improvements in the production of poly-substituted guanidines which correspond with the following probable general formula:

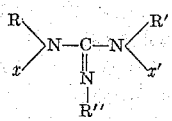

where R, R', and R" each represents a hydrocarbon radical or a derivative thereof, and $x$ and $x'$ each signifies a hydrogen atom or a hydrocarbon radical or a derivative thereof, and more particularly wherein said hydrocarbon radicals or their derivatives belong to the benzene series.

I claim:

1. In the production of a polysubstituted guanidine by a process which comprises subjecting a commixture of a thiourea having attached to each nitrogen atom at least one hydrocarbon radical and an organic primary amine to the action of a desulfurizing agent in the presence of water and of an inert non-hydroxylic organic solvent, the improvement which comprises carrying out the reaction from the beginning to substantial completion at a temperature below the boiling point of said solvent.

2. In the production of a polysubstituted guanidine by a process which comprises subjecting a commixture of a thiourea having attached to each nitrogen atom at least one hydrocarbon radical of the benzene series and a primary amine of the benzene series which may contain in the benzene nucleus a substituent selected from the group consisting of the alkyl, amino, chlor and nitro radicals to the action of a desulfurizing agent in the presence of water and of an inert liquid hydrocarbon solvent of the benzene series, the improvement which comprises carrying out the reaction from the beginning to substantial completion at a temperature below the boiling point of the reaction mixture.

3. In the production of a triarylguanidine by subjecting a diarylthiourea having attached to each nitrogen atom an aromatic hydrocarbon radical to the action of an aromatic primary amine which may contain in the aromatic nucleus a substituent selected from the group consisting of the alkyl, amino, chlor and nitro radicals in the presence of a desulfurizing agent, of water and of an inert non-hydroxylic organic solvent, the improvement which comprises carrying out the reaction from the beginning to substantial completion at a temperature below the boiling point of said solvent.

4. In the production of triphenylguanidine by the action of aniline on diphenylthiourea in the presence of a desulfurizing agent and of toluene, the improvement which comprises carrying out the reaction from the beginning to substantial completion at a temperature below the boiling point of toluene.

5. In the production of a polysubstituted guanidine by a process which comprises subjecting a commixture of a thiourea having attached to each nitrogen atom at least one hydrocarbon radical and an organic primary amine to the action of a desulfurizing agent, the improvement which comprises carrying out the reaction to substantial completion in the presence of water and of an inert organic solvent.

6. In the production of a polysubstituted guanidine by a process which comprises subjecting a commixture of a thiourea having attached to each nitrogen atom at least one hydrocarbon radical and an organic primary amine to the action of a desulfurizing agent, the improvement which comprises carrying out the reaction to substantial completion in the presence of water and of an inert non-hydroxylic organic solvent.

7. In the production of a polysubstituted guanidine by a process which comprises subjecting a commixture of a thiourea having attached to each nitrogen atom at least one hydrocarbon radical and an organic primary amine to the action of a desulfurizing agent, the improvement which comprises carrying out the reaction to substantial completion in the presence of water and of an inert liquid organic solvent which is substantially immiscible with water.

8. In the production of a polysubstituted guanidine by a process which comprises subjecting a commixture of a thiourea having attached to each nitrogen atom at least one hydrocarbon radical and an organic primary amine to the action of a desulfurizing agent, the improvement which comprises carrying out the reaction to substantial completion in the presence of water and of an inert liquid hydrocarbon solvent.

9. In the production of a polysubstituted guanidine by a process which comprises subjecting a commixture of a thiourea having attached to each nitrogen atom at least one hydrocarbon radical and an organic primary amine to the action of a desulfurizing agent, the improvement which comprises carrying out the reaction to substantial completion in the presence of water and of an inert organic solvent at a temperature below the boiling point of said solvent.

10. In the production of a polysubstituted guanidine by a process which comprises subjecting a commixture of a thiourea having attached to each nitrogen atom at least one hydrocarbon radical and an organic primary amine to the action of a desulfurizing agent in the presence of water and of an inert liquid hydrocarbon solvent, the improvement which comprises carrying out the reaction to substantial completion at a temperature below the boiling point of said hydrocarbon solvent.

11. In the production of a polysubstituted guanidine by a process which comprises subjecting a commixture of a thiourea having attached to each nitrogen atom at least one aromatic hydrocarbon radical and an aromatic primary amine which may contain in the aromatic nucleus a substituent selected from the group consisting of the alkyl, amino, chlor and nitro radicals to the action of a desulfurizing agent, the improvement which comprises carrying out the reaction to substantial completion in the presence of water and of an inert liquid organic solvent which is substantially immiscible with water.

12. In the production of a polysubstituted guanidine by a process which comprises reacting a mixture of a primary amine of the benezene series which may contain in the benzene nucleus a substituent selected from the group consisting of the alkyl, amino, chlor and nitro radicals with a thiourea having attached to each nitrogen atom a hydrocarbon radical of the benezene series with a desulfurizing agent, the improvement which comprises carrying out the reaction in the presence of water and of an inert liquid organic solvent which is immiscible with water and forms with water a minimum boiling-point azeotropic mixture, the reaction being carried out to substantial completion at a temperature not higher than the boiling-point of said azeotropic mixture.

13. In the production of a triarylguanidine by subjecting a diarylthiourea having attached to each nitrogen atom an aromatic hydrocarbon radical to the action of an aromatic primary amine which may contain in the aromatic nucleus a substituent selected from the group consisting of the alkyl, amino, chlor and nitro radicals in the presence of a desulfurizing agent, the process which comprises carrying out the reaction to substantial completion in the presence of water and of an inert liquid organic solvent.

14. In the production of a triarylguanidine by subjecting a mixture of a primary arylamine and a diarylthiourea to the action of a desulfurizing agent, the process which comprises carrying out the reaction to substantial completion in the presence of water and of an insert liquid hydrocarbon solvent at a temperature below the boiling-point of said solvent.

15. In the production of a triarylguanidine by subjecting a mixture of a primary arylamine and a diarylthiourea to the action of a desulfurizing agent, the process which comprises carrying out the reaction to substantial completion in the presence of water and of an inert liquid hydrocarbon solvent of the benezene series which forms with water a mimimum boiling-point azeotropic mixture, and at a temperature not higher than the boiling-point of said azeotropic mixture.

16. In the production of a triarylguanidine of the benezene series by subjecting a mixture of a primary amine of the benezene series and a diarylthiourea of the benzene series to the action of a desulfurizing agent, the process which comprises carrying out the reaction to substantial completion in the presence of water and of a liquid benzene hydrocarbon solvent having a boiling-point above 85° C., and maintaining the reaction mixture at a temperature below 85° C. until the reaction is substantially complete.

17. In the production of a triphenylguanidine by the action of a desulfurizing agent on a mixture of aniline and thiocarbanilid, the process which comprises carrying out the reaction to substantial completion in the presence of water and of an inert organic solvent.

18. In the production of triphenylguanidine by the action of a desulfurizing agent on a mixture of aniline and thiocarbanilid, the process which comprises carrying out the reaction to substantial completion in the presence of water and of toluene at a temperature not higher than the boiling-point of the azeotropic mixture formed by toluene and water.

19. In the production of triphenylguanidine by the action of a desulfurizing agent on a mixture of aniline and thiocarbanilid, the process which comprises carrying out the reaction to substantial completion in the presence of water and of toluene at a temperature not higher than about 85° C.

In testimony whereof I affix my signature.

HAROLD B. FOSTER.